Sept. 10, 1935. L. E. MORRISON 2,014,359
BEAD FOR PNEUMATIC TIRES AND METHOD AND APPARATUS FOR PRODUCING SAME
Filed May 20, 1933 3 Sheets-Sheet 1
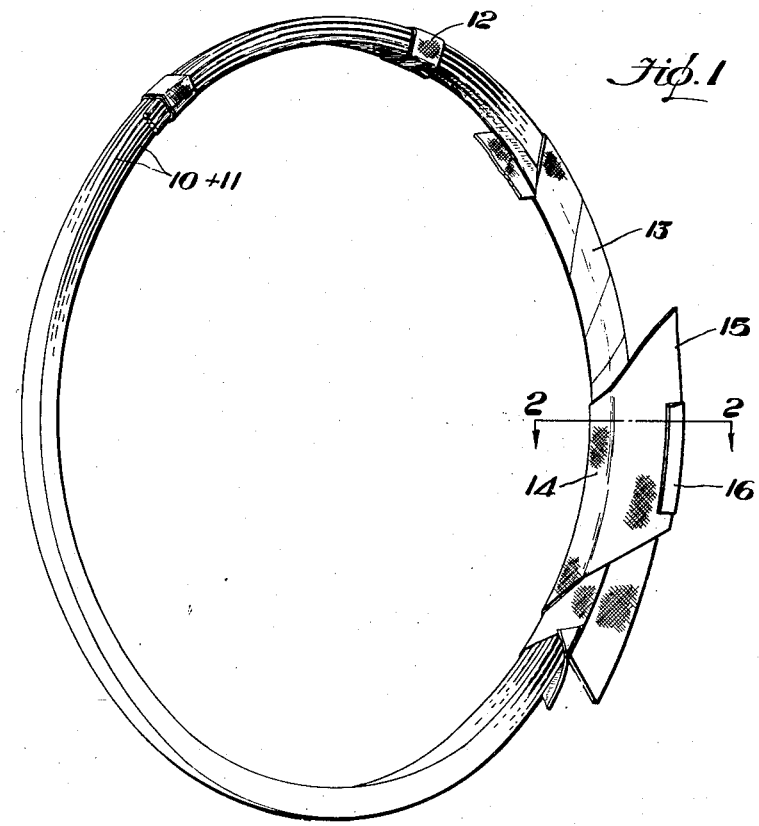
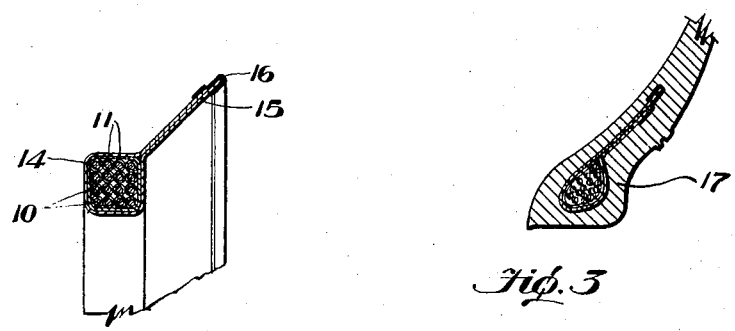
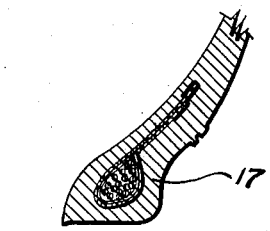
Inventor
Luther E. Morrison
Attorney

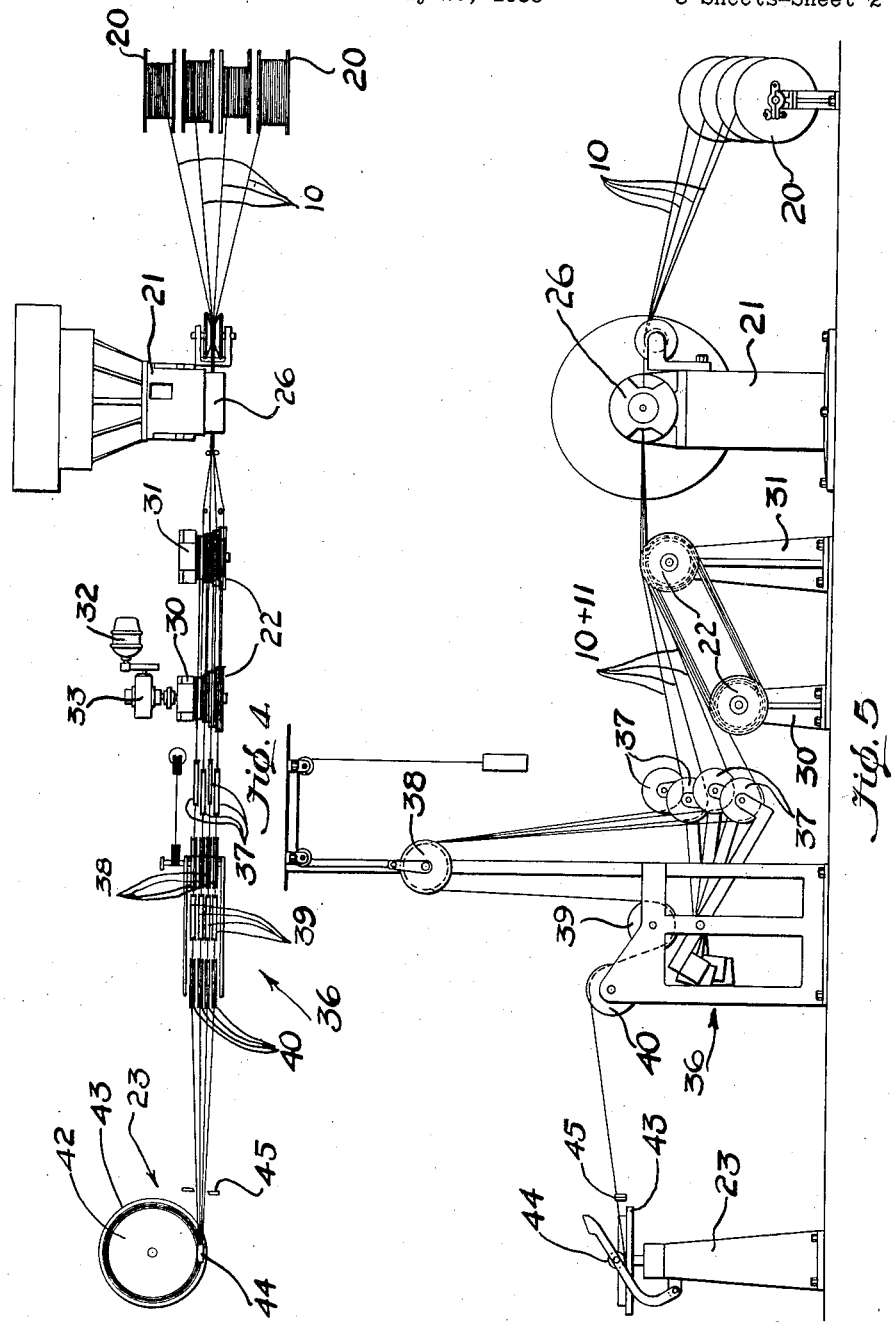

Sept. 10, 1935.  L. E. MORRISON  2,014,359
BEAD FOR PNEUMATIC TIRES AND METHOD AND APPARATUS FOR PRODUCING SAME
Filed May 20, 1933  3 Sheets-Sheet 3

Inventor
Luther E. Morrison

By

Attorney

Patented Sept. 10, 1935

2,014,359

UNITED STATES PATENT OFFICE 2,014,359

BEAD FOR PNEUMATIC TIRES AND METHOD AND APPARATUS FOR PRODUCING SAME

Luther E. Morrison, New York, N. Y., assignor to Wingfoot Corporation, Wilmington, Del., a corporation of Delaware Application May 20, 1933, Serial No. 672,024

33 Claims. (Cl. 154—14)

This invention relates to the art of manufacturing beads for pneumatic tires, and it is directed more particularly to a new form of inextensible bead for straight-side tires, as well as to a novel method and a novel apparatus for producing such bead.

Prior to this invention, tire beads with metallic reinforcements have been built commercially in several different ways, all of which have been characterized by inherent defects of one kind or another. Beads must be substantially inextensible to resist the complex strains to which they are subjected when in use, yet they must be compact and of relatively light weight, and capable of being manufactured at low cost. In one prior art method, beads have been made commercially with spirally wound reinforcements of metallic tape. Such tape in some instances includes a plurality of parallel longitudinal wires held in spaced relation by a cross-woven filler wire, and all embedded in a single body of rubber (see Patent No. 1,512,794), while in other instances the longitudinal wires are embedded in the unvulcanized rubber without any filler wire (see Patent No. 1,749,899).

When a tape construction is used as in either of the two patents referred to, the beads as initially built are substantially rectangular in cross-section, but by exerting pressure, this shape is changed to substantially triangular during the vulcanizing operation under the influence of the well-known mold contour. As the beads change to this final triangular shape, the rubber flows and the several turns of wires necessarily become relatively readjusted, as is readily understood, and experience has shown that this relative readjustment of the wires is not so well effected when the wires are initially made up in ribbon form as in the patents noted. It is also to be noted that when the bead wire is assembled by spiral winding on a drum or other form, the resulting bead is not truly circular, and this, coupled with the overlapping of the wire ends, imparts a certain degree of weight unbalance that must be compensated for in the finished tires to meet the exacting requirements of present day standards.

One of the objects of the present invention is to provide a bead or bead reinforcement having a true circular shape, improved stress-strain characteristics, and greater inherent facility of the component wire strands to shift and rearrange with reference to each other as the cross-sectional shape of the bead changes during cure, thus avoiding the weakening defect of "wild" or displaced individual strands heretofore unavoidable. It has been found that, notwithstanding the greater facility to readjust themselves during vulcanization, the wires will be more closely bunched and better concentrated at the base of the bead than is usually possible.

Another object is to provide such a bead in which the embedded wires are better protected from rust-provoking moisture, thus insuring greater longevity in service.

Another object is to provide such a bead which can be economically produced, and constitutes a substantial advance in the art to which the invention relates.

A further object is to provide a novel method and novel method steps for building these improved beads.

A further object is to provide simple and novel apparatus for producing the improved beads with efficiency and economy.

More specifically, the invention contemplates the construction of beads from a plurality of individually rubber-covered wires wound in concentric helices and secured together in endless annular form. While the wires may be independently covered or coated, it is preferable to draw them simultaneously through separate die openings of a so-called tubing machine or extruder, and in order to pass the wires so covered directly to the bead builder, they are drawn through the tubing machine at relatively different speeds to compensate for the different speeds at which they are helically wound on the building form. The differential-speed drawing means may take various forms and be continuously operable, and the covered wires thereafter pass to suitable festooning devices from which they are later drawn to an intermittently operable bead-building machine.

The foregoing and other objects, features and advantages of the invention will be readily appreciated from the following description in connection with the accompanying drawings, wherein preferred embodiments have been shown merely by way of illustration, and wherein Figure 1 is a perspective view, partly broken away, of a green or uncured bead made in accordance with this invention;

Figure 2 is a transverse sectional view taken on line II—II of Figure 1, and drawn on a larger scale;

Figure 3 is a fragmentary sectional view through the bead portion of a finished tire;

Figure 4 is a diagrammatic plan view of novel apparatus for constructing the improved beads;

Figure 5 is a diagrammatic side view of the apparatus shown in Fig. 4;

Figure 6:
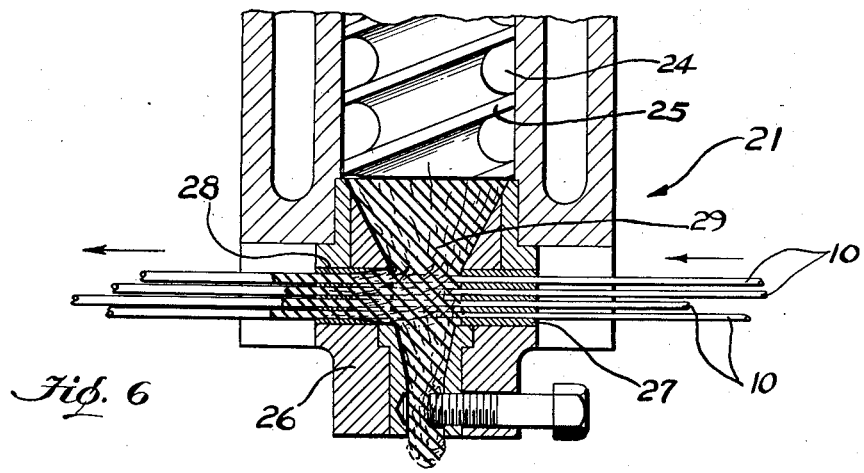
Figure 6 is a fragmentary horizontal sectional view through the die head of the rubber covering machine.

An uncured bead embodying the invention is shown in Figure 1, wherein it will be seen that the bead comprises a plurality of wires 10 which are closely wound in concentric helices, giving the bead an endless annular form. The wires 10 may be of any suitable metal or alloy, and may be plated, coated, or otherwise treated to prevent corrosion and to promote adhesion to covering sheaths of rubber 11 of proper consistency and compounding, said rubber sheaths being initially applied to the metal in unvulcanized condition. There are four such wires shown in the drawings and each wound in four helical convolutions, but obviously the specific number of wires, as well as the number of their turns, may be varied as desired for different sizes of beads. Strips of adhesive tape 12 or their equivalents may be employed to bind the opposite ends of the wires to the adjacent convolutions, thus maintaining the bead in the desired size and circular form and preventing what are known as "high wires" in the finished tires. In order further to insure maintenance of desired size and shape, the bead may be wrapped with fabric tape 13 which preferably is spirally wrapped in overlapping edge relation and extending entirely around the bead. This wrapping of tape 13 may be omitted in some cases, and when used, the strips 12 may be unnecessary, the selection being dependent upon considerations of size, weight, and permissible cost. The purpose of this wrapping is two-fold: (1) to confine the wires and thus to restrict the flow of their surrounding rubber during vulcanization; and (2) to assist in keeping moisture away from the wires when in use in a finished tire.

In addition to the wire covering materials already referred to, the bead may be encircled by a flipper strip 14 to facilitate its anchorage with respect to the various cord or fabric plies of the tire carcass. This flipper strip may be of any ordinary or approved type, being preferably formed of bias-cut cross-woven fabric, and having laterally extending over-lapping edge portions 15 which, if desired, may have applied to them a relatively thin gum strip 16.

Beads of this type may be cured or semi-vulcanized before they are built into the tires, or they may be applied in green condition and vulcanized at the same time as the tires, the latter being the more common practice in manufacturing the smaller sizes of tires, as for passenger cars. As is best shown in Figure 2, the bead assembly is of substantially square or rectangular cross-section when in the green condition, but during vulcanization this shape is changed into one substantially triangular as in Fig. 3. This change in shape is brought about by the flowing of the rubber under heat and pressure sufficient to mold the bead portion 17 of the tire as influenced by the contour of the well-known tire molds, and it is because of this changing of shape that the wires must be capable of certain relative movement yet held within definite confines. This desirable feature is greatly facilitated by initially winding the wires in concentric helices in accordance with the present invention.

It will be readily understood that the several wires forming the bead will necessarily be of different lengths because of their concentric helical winding; and their peripheral winding speeds will be different if they are wound simultaneously as will later be explained. By way of illustration, the wires in the bead of a conventional 5.50 x 18″ tire measure as follows: the first or inside wire is 20 ft. ½ in. long; the next or second wire is 20 ft. 1⅝ in. long; the next or third wire is 20 ft. 2⅛ in. long; and the fourth or outside wire is 20 ft. 4½ in. long, all based upon four turns per strand. Thus it will be seen that in this particular bead size, the outside wire is four inches longer than the inside wire, while the two intermediate wires vary in lesser amounts.

Figure 7:
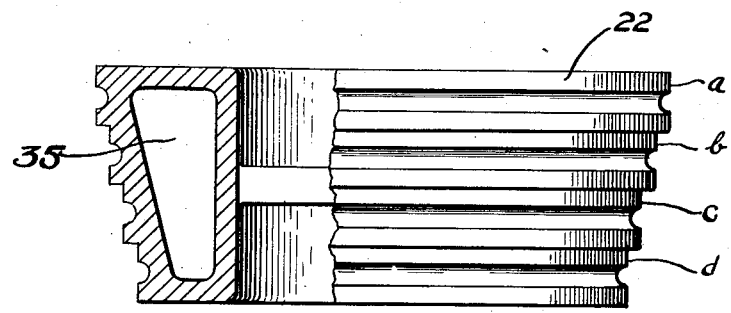
Figure 7 is a view partly in elevation and partly in section, showing one of the differential speed drawing rolls per se.
Figure 8:
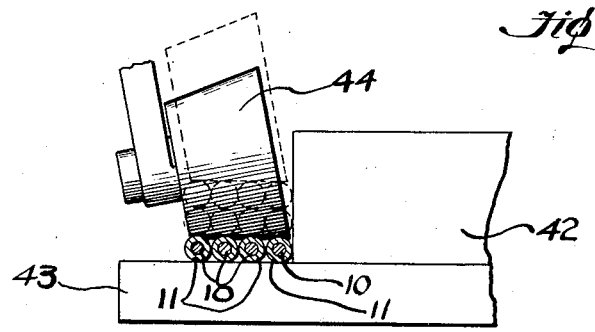
Figure 8 is a fragmentary view of the bead building drum and pressure roller.

While the improved beads may be built by successively winding helically the several individually covered wires, they are preferably, for greater facility, produced by the novel method and apparatus shown diagrammatically in Figures 4 to 8 inclusive, wherein the several wires are simultaneously wound in close concentric helices. More specifically, the novel method consists in passing the several bare metal wires simultaneously through a rubber covering machine wherein they will be individually covered or coated with unvulcanized rubber, and then passing the covered wires to a drum whereon they are simultaneously wound helically. Because of the difference in winding speeds of the several wires on the periphery of the drum as previously pointed out, the wires are delivered to the drum at different speeds or in different quantities, and for this reason, when production is carried on in a continuous process from bare wire to wound bead, the wires are passed through the rubber covering means at different relative speeds. This is best shown in Figures 4 and 5, to which reference will now be made in more detailed description.

From reels 20 or other suitable supply means, the individual wires 10, in the illustrated embodiment, are drawn through the insulating or rubber covering unit 21 by a pair of drawing rolls 22, and thence supplied to the bead building machine 23. The insulating unit 21 may preferably be a screw-feed extruding machine comprising a feed cylinder 24 through which plastic rubber is longitudinally propelled by a screw 25 to an extrusion die head 26 (see Figure 6). The wires, in spaced parallel relation, pass through the die head 26 in a direction transverse to the axis of the feed cylinder 24 and screw 25, and they are guided in their entrance by an apertured die member 27. The apertures in the die member 27 are of substantially the same diameter as the wires 10, and are in axial alinement with larger apertures in an insulating die 28 through which the wires leave the die head 26. Within the die head 26 and between the die members 27 and 28 there is a pressure chamber 29 filled with plastic rubber under pressure, and as the wires 10 pass through this pressure chamber they become completely surrounded by the rubber, some of which passes with the wires through the die 28. Thus, as the wires emerge from the die head 26, they are individually coated with rubber but spaced apart from each other, and thereafter they are caused slightly to diverge before they reach the drawing rolls 22.

Suitable pedestals 30 and 31 support the drawing rolls 22 in spaced relation for rotation about axes which are substantially horizontal and perpendicular to the direction of travel of the wires.

One of these rolls 22 is positively and continuously driven by a motor 32 through gearing 33, and the insulated wires are run belt-like over and between the two rolls 22 whereby the second roll is caused to rotate at the same speed as the first. In order to effect the required speed differential for the several wires, the peripheries of the drawing rolls 22 are formed with steps a, b, c, and d, of progressively varying diameters calculated to have the same peripheral speeds as the winding speeds of the wires on the drum, each wire being run on a different step of the drawing roll. This arrangement is only one of several means for achieving the differential drawing speeds, and in this respect the invention is not limited to any specific type of apparatus. Incidentally the rolls 22 may be formed with jackets 35 for the circulation of cooling water if desired, whereby partly to cool and set the rubber on the wires after they leave the insulating machine.

As the drawing rolls 22 operate continuously and the bead building machine 23 intermittently, it is necessary to have some intermediate means for accumulating the insulated wires while they are not being taken by the building machine, and for this purpose, a festooning unit 36 may be employed. In the illustrated embodiment, the unit 36 comprises a plurality of separately floating pulleys 37 under which the wires pass in their path from the drawing rolls, said pulleys 37 being adapted, under the influence of gravity, to impose a slight tension on the wires and thus to take up any slack between supply and consumption. After passing under the pulleys 37, the wires pass upwardly over a corresponding number of coaxially mounted floating pulleys 38 and thence downwardly and successively under and over fixed guide pulleys 39 and 40, and then to the bead building unit 23. As with the other machine units, the details of the festooning unit 36 form no part of the present invention, and in fact the invention is not limited to any particular type of festooning unit; hence more complete description thereof is unnecessary for a full understanding of the invention.

The bead building machine 23 generally may be of any ordinary or approved form and is characterized by a substantially horizontally disposed circular bead building form or drum 42 which is intermittently rotated by suitable power means not shown. This drum 42 is formed with a peripheral flange 43 on its lower edge upon which the wires are received in side-by-side relation and pressed down in the winding operation by a manually-controlled pressure roller 44. The leading ends of the wires are attached in the usual way to the drum (as by means of a gripper carried by the drum) so that the rotation of the drum will draw the wires from the festooning device and wind them in helical fashion on the drum. After a sufficient number of helical turns of the wires have been laid or wound on the drum, the rotation thereof is interrupted and the wires cut off by shearing means 45, leaving the wound wires free to be removed from the drum, taped, flipped, and otherwise operated upon to produce the finished bead.

From the foregoing it will be evident that the improved beads may be expeditiously produced by the novel method disclosed, and that the invention is therefore thoroughly practical and conducive to quantity production at low cost. Extensive tests and actual use have proved the superiority of these beads in respect to higher tensile strength and longer life and other characteristics. Obviously the invention is susceptible of modifications in the details of construction and in the steps of the method of manufacture, and the right is herein reserved to make such changes as fall within the scope of the appended claims without departing from the spirit of the invention.

Having thus described my invention, what I claim is:

1. In a tire bead construction, an inextensible reinforcement comprising a plurality of individually rubber-covered metallic wires arranged in concentric helices.

2. A tire bead comprising a body of rubber and a plurality of separate wires imbedded therein in helical concentric relation, the wires being insulated from one another by the rubber, and the convolutions of each wire being likewise insulated from one another by the rubber.

3. A tire bead comprising a plurality of individually insulated wires helically wound in concentric relation.

4. A tire bead comprising a plurality of individually rubber-covered wires helically wound in concentric relation, and means for holding the ends of the wires against displacement.

5. A tire bead comprising a plurality of individually rubber-covered wires helically wound in concentric relation, and a fabric cover closely enveloping the wires in such relation.

6. A tire bead comprising a plurality of individually rubber-covered wires helically wound in concentric relation, and a strip of fabric wrapped spirally about the wires to maintain them in desired relation.

7. A circular tire bead comprising a plurality of separate wires arranged in close concentric helices, each wire being individually coated with rubber, the several wires being separated from each other only by their rubber coatings, and fabric tape covering the end portions of the wires to hold them against displacement.

8. An uncured bead unit comprising closely-wound concentric helices of individually rubber-covered wires, the wires being separated from each other only by rubber, a fabric covering strip wrapped spirally about the so-assembled wires, and a flipper strip formed of rubberized fabric and circumferentially covering the spirally-wrapped assembly of wires, the fabric of said flipper strip having its side edges brought substantially together and left extending radially outward from the wire annulus.

9. The method of making tire beads which consists in providing a plurality of suitable lengths of separate, individually rubber-coated wire, and forming said lengths of wire into concentric helices.

10. The method of making tire beads which consists in providing a plurality of suitable lengths of separate wire, and simultaneously forming said lengths of wire into concentric helices.

11. The method of making tire beads which consists in providing a plurality of suitable lengths of separate, individually rubber-coated wire, and simultaneously winding said lengths of wire as close concentric helices on a suitable form.

12. The method of making tire beads which consists in simultaneously feeding a plurality of spaced wires through separate die openings of an extruding machine whereby to coat said wires individually with a plastic such as rubber, bringing the coated wires into side-by-side contacting relation, and simultaneously winding the wires helically on a suitable form.

13. In the art of making tire beads, the novel steps which consist in continuously feeding at relatively different speeds a plurality of separately rubber-covered wires from supply means to temporary storing devices, and intermittently drawing the wires from said storing devices and winding them in concentric helices on a suitable form.

14. In the art of making tire beads, the novel step which consists in simultaneously, but at different relative speeds, passing a plurality of separate bead wires through a rubber-covering device.

15. In the art of making tire beads, the novel step which consists in simultaneously, but at different relative speeds, passing a plurality of separate bead wires through separate die openings of a plastic-extruding machine whereby to coat the wires individually and thus to facilitate their simultaneous helical winding on a circular bead-building form.

16. In the art of making tire beads, the novel step which consists in simultaneously winding helically in concentric relation a plurality of separate insulated wires.

17. In apparatus for making tire beads, the combination of a bead-building form, means for supplying a plurality of wires in side-by-side relation, and means for simultaneously winding said wires helically on the form.

18. In apparatus for making tire beads, the combination of a rotatable bead-building drum, means for supplying a plurality of insulated wires in close side-by-side relation substantially in the plane of rotation of the drum, and means for simultaneously guiding said wires to helical winding position adjacent the periphery of the drum.

19. In apparatus for making tire beads, the combination of a horizontal bead-building drum, means for rotating the drum, means for supplying a plurality of insulated wires in side-by-side relation and substantially in the horizontal plane of rotation of the drum, and means for simultaneously guiding said wires to helical winding position adjacent the periphery of the drum.

20. Tire-bead-making apparatus comprising means for simultaneously covering with rubber a plurality of spaced, parallel independent wires, a bead-building drum, and means for feeding the individually rubber-covered wires to said drum at different speeds, whereby to facilitate the winding of the wires simultaneously in concentric helices on the drum with uniform tension.

21. Tire-bead-making apparatus comprising means for simultaneously covering with rubber a plurality of spaced, parallel independent wires, a rotatable bead-building drum, and means for guiding the individually rubber-covered wires to winding position on said drum, whereby to facilitate winding the wires simultaneously but with substantially uniform tension in concentric helices on the drum.

22. Tire-bead-making apparatus comprising means for simultaneously covering with rubber a plurality of spaced, parallel independent wires, a horizontal bead-building drum, and means for feeding the individually rubber-covered wires in a substantially horizontal plane to said drum but at different speeds, whereby to facilitate the winding of the wires simultaneously but with substantially uniform tension in concentric helices on the drum.

23. Tire-bead-making apparatus comprising a rubber extruding machine having a die with a plurality of separate die openings, means for drawing a plurality of separate wires simultaneously through the die of the extruding machine in spaced parallel relation and at relatively different speeds, whereby individually to cover said wires with rubber, separate festoon devices for receiving the wires so covered, a bead-building drum, and means for guiding the rubber-covered wires from the festoon devices to the drum in side-by-side relation and in the plane of rotation of the drum for helical winding thereon.

24. Apparatus for making tire beads comprising an extruding machine having a die with a plurality of separate die openings, means for drawing a plurality of wires simultaneously through the die openings at different speeds, whereby simultaneously to cover the separate wires individually with rubber, means for storing separately the wires so covered, a rotatable bead-building drum, and means for guiding the rubber-covered wires from said storing means to said building drum in side-by-side relation and substantially in the plane of rotation of the drum for helical winding thereon.

25. Tire-bead-making apparatus comprising a continuously operable extruding machine having a die with a plurality of separate die openings, means for drawing a plurality of separate wires simultaneously through the die of the extruding machine in spaced parallel relation but at relatively different speeds, whereby individually to cover said wires with rubber, separate festoon devices for receiving the wires so covered, an intermittently operable bead-building drum, and means for simultaneously guiding the rubber-covered wires from said festoon devices to the drum in side-by-side relation and in the plane of rotation of the drum for helical winding thereon.

26. Apparatus for making tire beads comprising a continuously operable extruding machine having a die with a plurality of separate die openings, means for drawing a plurality of wires simultaneously through the die openings at different speeds, whereby simultaneously to cover the separate wires individually, automatically controlled festooning means for temporarily storing the separate wires so covered, an intermittently rotatable bead-building drum, and means for guiding the covered wires from said festooning means to said building drum in side-by-side relation and substantially in the plane of rotation of the drum, whereby the wires may be wound on the drum in close concentric helices.

27. In a tire bead construction, an inextensible reinforcement comprising a plurality of individually rubber-covered metallic wires arranged in concentric helices having the same number of convolutions.

28. A tire bead comprising a body of rubber and a plurality of separate wires embedded therein in helical concentric relation, the wires being insulated from one another by the rubber, and the several convolutions of the wires being of equal number and being likewise insulated from one another by the rubber.

29. A tire bead comprising a plurality of individually insulated wires helically wound in concentric relation and of the same pitch.

30. The method of making tire beads which consists in providing a plurality of suitable lengths of separate, individually rubber-coated wire, and forming said lengths of wire into concentric helices of equal pitch.

31. The method of making tire beads which consists in providing a plurality of suitable lengths of separate, individually rubber-coated wire, and forming said lengths of wire into concentric helices, composing each helix of a single wire and confining each wire to its particular helix.

32. The method of making tire beads which consists in providing a plurality of suitable lengths of separate wire, and simultaneously forming said lengths of wire into concentric helices having the same number of convolutions.

33. The method of making tire beads which consists in providing a plurality of suitable lengths of separate, individually rubber-coated wire, and simultaneously winding said lengths of wire on a suitable form as close concentric helices of the same pitch.

LUTHER E. MORRISON.